Figure 1:
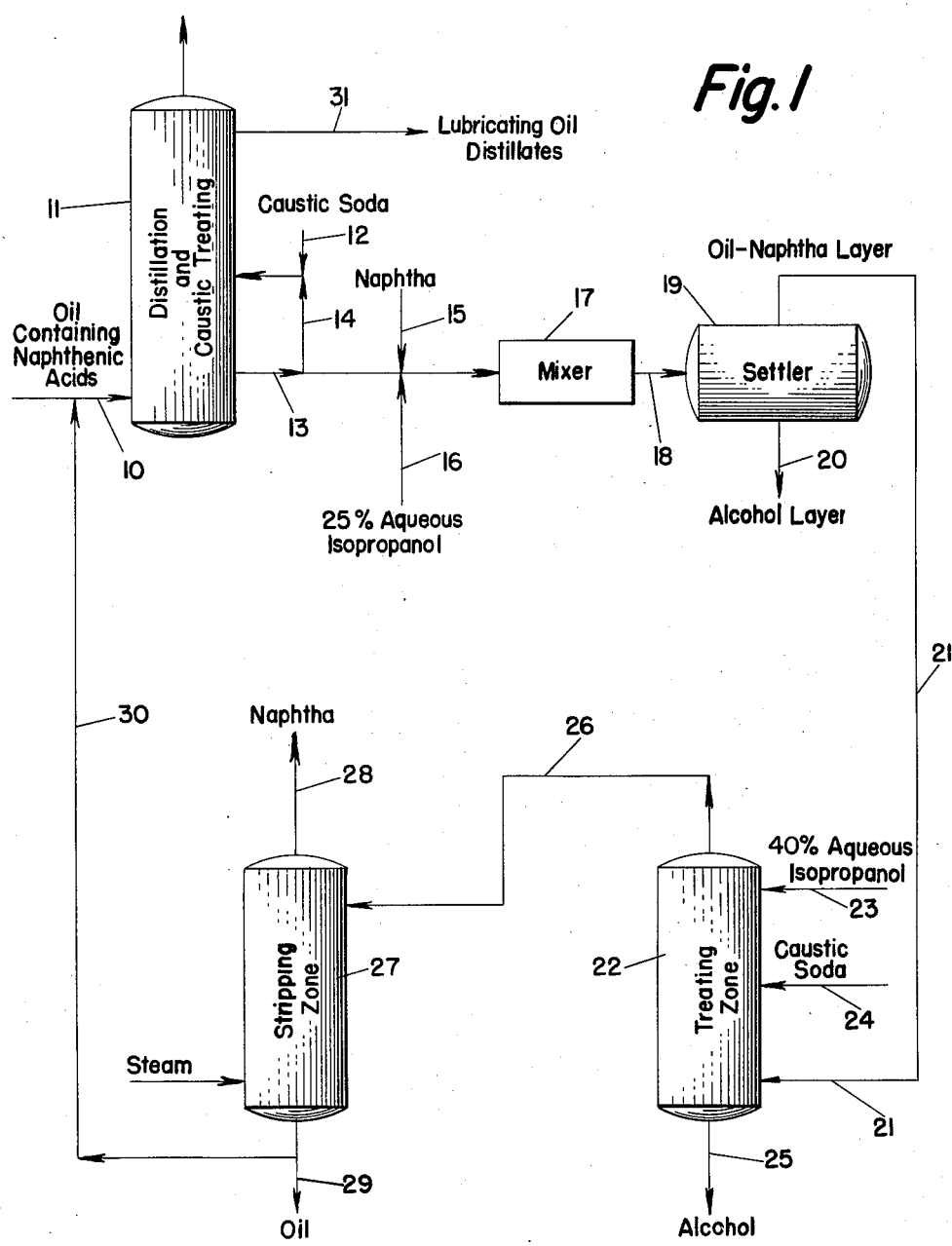

A — Nonacidic Oil
B — Nonacidic Oil Treated With Alcohol
C — Nonacidic Oil Treated With Alcohol And NaOH

INVENTOR.
HUGH L. MYERS

A — 50% Water, 0.5% NaOH
B — 50% Water, 1.5% NaOH
C — 30% Water, 4.5% NaOH
D — 30% Water, 0.5% NaOH

*INVENTOR.*
HUGH L. MYERS

ATTORNEY

United States Patent Office 2,846,359
Patented Aug. 5, 1958

2,846,359

PREVENTING LOSS OF COLOR ON AGING BY TREATING WITH ALCOHOL AND ALKALI

Hugh L. Myers, Springfield, Pa., assignor to Sun Oil Company, Philadelphia, Pa., a corporation of New Jersey Application November 2, 1955, Serial No. 544,441

4 Claims. (Cl. 196—41)

This invention relates to the refining of petroleum, and more particularly to the obtaining of petroleum products having good color stability and other properties.

It is known in the art to remove naphthenic acids from petroleum fractions by neutralizing the acids with a basic substance and extracting the neutralization products by means of aqueous alcohol. The product oil obtained often has unsatisfactory color stability, however, and the present invention provides a novel manner of improving the color stability of such oils.

According to the present invention, a petroleum fraction obtained by extraction of naphthenic acids neutralization products with aqueous alcohol is further contacted with aqueous alcohol in the presence of an inorganic basic compound, the concentration of alcohol in the treating agent being greater than in the aqueous alcohol used in the previous extraction. It has been found that a greater concentration is required for the obtaining of satisfactory color stabiliy than is desirable to use in the previous extraction.

Lower alkanols having 1 to 3 carbon atoms are generally suitable for use according to the invention. Methanol, ethanol, n-propanol, and isopropanol are the alkanols which can be employed.

The concentration of alkanol in the treating agent employed according to the invention is preferably within the approximate range from 30 to 50 weight percent, more preferably 35 to 45 weight percent, and the concentration of basic compound in the treating agent is preferably within the approximate range from 0.1 to 5 weight percent, more preferably 1 to 3 weight percent, and is in any event sufficiently low so that the treating agent is a single-phase solution. A preferred area of operation in the case of an aqueous solution of isopropanol and sodium hydroxide is that shown as the area ABCD in Figure 4, as subsequently more fully described.

The base which is employed according to the invention can be any of the well known water-soluble inorganic bases, for example sodium hydroxide, potassium hydroxide, sodium carbonate, potassium carbonate, calcium hydroxide, ammonia, etc. Mixtures of bases can be employed. The amount of base is preferably within the approximate range from 0.1 to 2.0 weight percent based on charge oil.

The amount of aqueous alcohol employed is preferably within the approximate range from 20 to 60 volume percent based on charge oil.

The treatment according to the invention, in the case of the more viscous charge stocks, is preferably carried out in the presence of a saturated hydrocarbon solvent having an average number of carbon atoms within the approximate range from 5 to 10, e. g. straight run petroleum naphtha, aviation alkylate, etc. Where a solvent is used, the amount is preferably within the approximate range from 50 to 100 volume percent based on charge oil.

Any suitable temperature can be employed in the treatment according to the invention. Generally, higher temperatures favor the refining efficiency, until a point is reached at which thermal decomposition produces excessive color degradation. The satisfactory range of temperatures varies with charge stock and other factors, but a preferred range is that between 50° F. and 200° F.

Preferably, the treatment with alcohol and base according to the invention is followed by contact with aqueous alcohol in the absence of added base, in order to remove residual base and reaction products from the oil. The strength of alcohol employed can be generally similar to that employed in the treatment according to the invention.

Any suitable petroleum charge stock can be treated according to the invention, e. g. such normally non-gaseous materials as crude petroleum, lubricating oil distillates, gas oil, kerosine, gasoline, and wax fractions, etc.

The process according to the invention involves, prior to the treatment previously described for color stabilization, the neutralization of acidic materials and extraction of the neutralization products from the petroleum by means of a lower alkanol. In such neutralization the presence of excess base is not essential, and the amount of excess base if present is preferably not substantially greater than 2 weight percent based on charge. A hydrocarbon solvent as previously specified is preferably present, in the case of more viscous charge stocks, in amount within the approximate range from 50 to 100 volume percent based on charge oil. The concentration of aqueous alcohol employed is preferably within the approximate range from 15 to 40 weight percent, more preferably 20 to 30 weight percent, and the amount is preferably within the approximate range from 100 to 250 volume percent based on solvent-free charge oil. The concentration of the alcohol is at least 5 weight percent less than in the treatment according to the invention.

Figure 2:
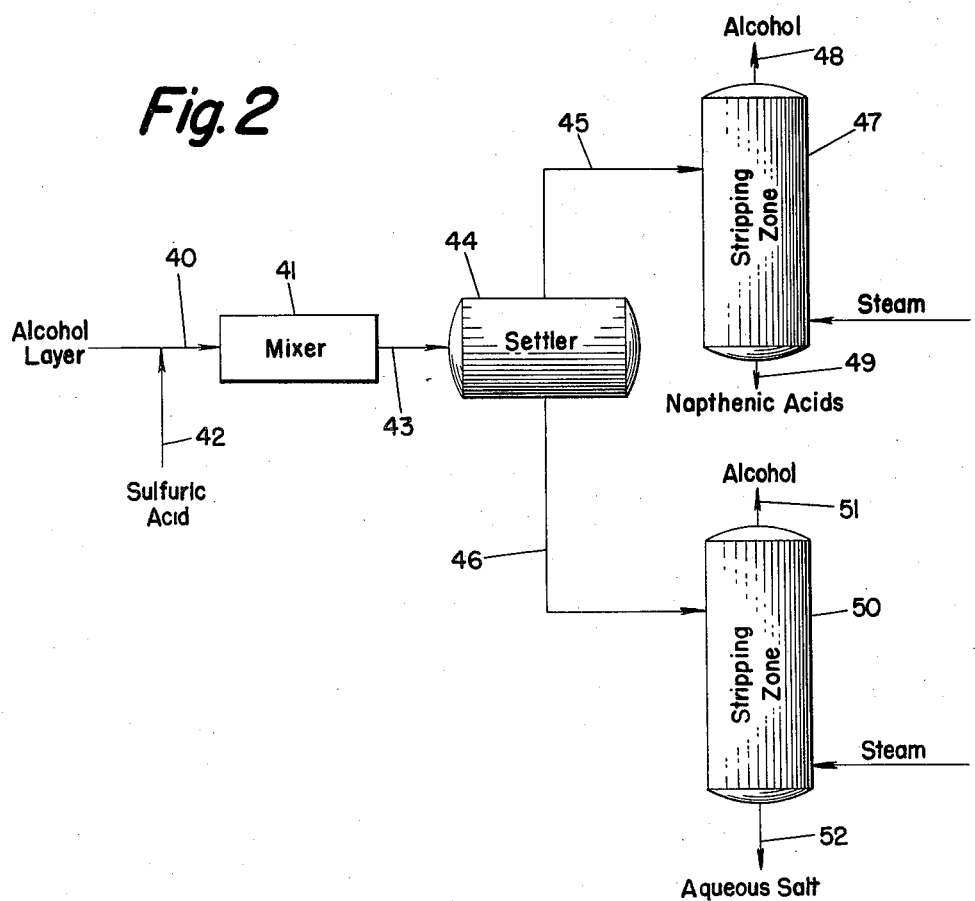
Figure 3:
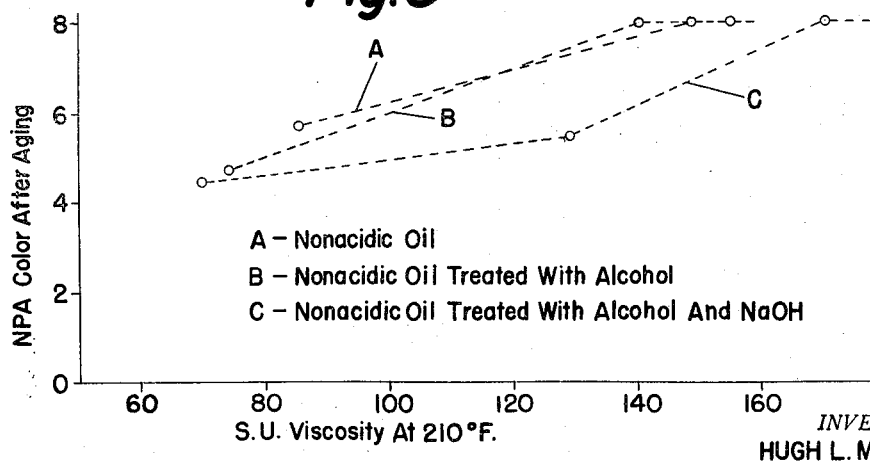
Figure 4:
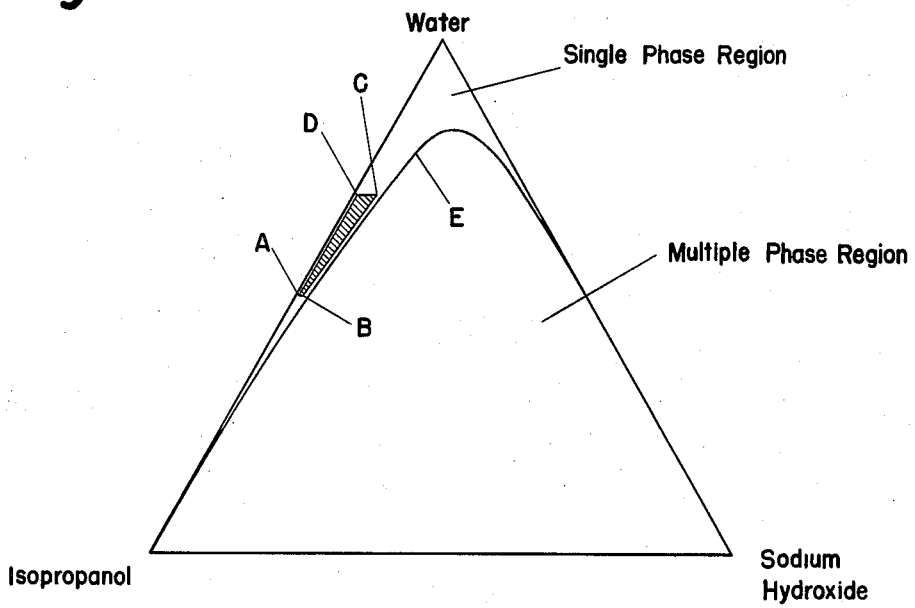

The invention will be further described with reference to the attached drawing, in which Figures 1 and 2 are flowsheets of one embodiment of the process according to the invention, in which Figure 3 is a graph showing the effect of the treatment according to the invention on the color stability of the oil, and in which Figure 4 is a triangular diagram illustrating preferred isopropanol-water-sodium hydroxide compositions for use as treating agents according to the invention.

In the operation illustrated in Figure 1, mineral oil containing naphthenic acids is neutralized by contact of the oil vapors with aqueous caustic soda. A portion of the oil condenses in the caustic treating zone to produce an oil fraction containing sodium naphthenates and excess caustic. This fraction is then extracted with aqueous isopropanol to remove sodium naphthenates and excess caustic, and the resulting raffinate oil, which is nonacidic, is then treated according to the invention with aqueous caustic soda and with aqueous isopropanol at rates and concentrations such as to provide an aqueous treating agent containing about 40 percent isopropanol and about 0.5 percent sodium hydroxide.

Referring now to Figure 1, mineral oil containing naphthenic acids is introduced through line 10 into a distillation and caustic-contacting zone 11. Caustic soda, e. g. 50° Bé. caustic soda is introduced into zone 11 through line 12 and is contacted in zone 11 with oil vapors evolved from the charge oil introduced through line 10. The caustic soda reacts with naphthenic acids in the vapors to form sodium naphthenates, and the sodium naphthenates, together with condensed liquid oil, are removed from zone 11 through line 13. The alkaline material removed through line 13 may contain for example about 85% oil, 14% sodium naphthenates and 1% sodium hydroxide. A portion of the material removed is recycled to zone 11 through line 14. The remainder of the material is admixed with a suitable amount (usually in the range from 50 to 100 volume percent) of naphtha introduced through line 15 and with 25% aqueous isopropanol introduced through line 16. The various materials are mixed in mixer 17, which may be of any suitable construction, and are then passed through line 18 into settling zone 19.

The alcohol layer from settling zone 19 is withdrawn through line 20, and is treated as subsequently described with reference to Figure 2, to recover naphthenic acids therefrom. The naphtha layer from settling zone 19 is withdrawn through line 21 and introduced into oil treating zone 22, wherein it is contacted with about 40 volume percent (based on solvent-free oil) of 40% aqueous isopropanol introduced through line 23 and with about 0.4 volume percent (based on solvent-free oil) of 50° Bé. caustic soda introduced through line 24. The manner of operation in treating zone 22 is countercurrent extraction, with alcohol and caustic soda flowing downwardly through the treating zone, and the solution of oil and naphtha rising through the treating zone. The alcohol layer is withdrawn through line 25 for subsequent treating as described with reference to Figure 2. The treated naphtha layer is withdrawn through line 26 and introduced into stripping zone 27, wherein naphtha is distilled from the oil and removed through line 28. The treated, solvent-free oil is withdrawn through line 29, and all or a part thereof can be returned if desired to zone 11 by way of lines 30 and 10.

The oil obtained from stripping zone 27 has superior properties including greater color stability than oil which has not been subjected to the treatment in zone 22. Because of this greater color stability, this oil is suitable for recycling to zone 11, whereas a less stable oil would be unsatisfactory for such purpose, in that it would cause the lubricating oil distillates obtained from zone 11, as indicated by the line 31, to have unsatisfactory color stability. It is desirable, and in some cases necessary, to recycle to zone 11 oil recovered from the alkaline material withdrawn through line 13, such recycling being necessary in order to maintain a sufficiently high oil content in the alkaline material which is circulated through zone 11 by means of lines 12, 13 and 14. The maintenance of a high oil content is essential to the avoidance of formation of excessive deposits in the caustic contacting zone within zone 11. The process illustrated in Figure 1 makes it possible to use the oil recovered from the circulated alkaline material as a source for the additional oil to be introduced into zone 11.

Figure 2 of the drawing illustrates the alcohol recovery system for the process according to the invention. In this system the alcohol layers obtained from oil treating zone 22 and from settling zone 19 can be commingled and passed through line 40 into mixer 41, sulfuric acid having been introduced through line 42 into admixture with the alcohol layer. The sulfuric acid reacts with the alkali metal naphthenates in the alcohol layer to form free naphthenic acids and alkali metal sulfates; the sulfuric acid also reacts with excess alkali in the alcohol layer to form inorganic salts.

The resulting mixture is passed through line 43 into settling zone 44, from which the naphthenic acid layer is withdrawn through line 45, the aqueous layer being withdrawn through line 46. Alcohol is stripped from the naphthenic acid layer in stripping zone 47 and removed through line 48. Solvent-free naphthenic acids are withdrawn from stripping zone 47 through line 49. Alcohol is stripped from the aqueous layer in stripping zone 50, and is removed through line 51, aqueous inorganic salt solution being withdrawn as residue through line 52. The alcohol recovered from stripping zones 47 and 50 can be re-used as solvent in the process previously described.

In the operation illustrated in Figure 2, wherein the alcohol layers from treating zone 22 and from settling zone 19 are commingled prior to further treatment, the impurities extracted from the oil in the treating zone 22 become incorporated for the most part in the naphthenic acid product obtained from stripping zone 47. In many instances, the presence of these impurities will not be objectionable in the naphthenic acid product, whereas they would have been objectionable in the oil product. In cases where the presence of the impurities would be objectionable in the naphthenic acid product also, the alcohol layers recovered respectively from treating zone 22 and from settling zone 19 can be separately processed for recovery of alcohol for re-use as solvent.

The distillates obtained as indicated by line 31 of Figure 1 are nonacidic, and can advantageously be treated with aqueous alcohol and base according to the invention.

Figure 3 will be described with reference to the following example, which illustrates the invention:

A process according to the general scheme illustrated in Figure 1 was carried out, employing a reduced naphthenic crude as the charge for introduction into zone 11 through line 10. The alkaline material withdrawn through line 13 contained about 85% oil and slightly more than 1% alkali metal hydroxide, and the balance was largely alkali metal naphthenates with some inorganic salts. This alkaline material was diluted with water until it contained about 20% of water, and 140 volumes of the diluted material was mixed with 150 volumes of 40% (weight basis) aqueous isopropanol, about 50 volumes of additional water, and 90 volumes of aviation alkylate (hereinafter referred to as naphtha). The alcohol and naphtha layers were separated at 120° F. to obtain a naphtha layer containing about 100 volumes of oil having acid number of essentially zero. One portion of the naphtha-oil layer was stripped to remove naphtha, and the nonacidic solvent-free oil was distilled in the presence of 1½ volume percent of 50° Bé. caustic soda to obtain five cuts, each constituting 10% of the distillation charge, and a sixth cut constituting 6% of the distillation charge.

Another portion of the naphtha-oil layer was washed three times with 40% aqueous isopropanol containing 1 volume percent of 50° Bé. caustic soda (corresponding to about 1 weight percent concentration NaOH) and then washed once with 40% aqueous isopropanol in the absence of caustic soda. The total amount of aqueous isopropanol employed was about 160 volume percent based on solvent-free oil, and each wash employed approximately the same amount of aqueous isopropanol. The treated oil was then stripped of naphtha and distilled in the presence of 1½ volume percent of 50° Bé. caustic soda to obtain six 10% cuts and a seventh cut constituting 3% of the distillation charge.

The color stabilities of the various cuts obtained were determined by aging samples for 16 hours at 221° F. The following table shows the NPA colors before and after aging, for each of the six cuts obtained from the oil which was not treated with alcohol after removal of naphthenates. The table also shows the Saybolt Universal viscosities at 100° F. and 210° F. for various cuts.

| Cut No. | Vis./100 | Oil—Product A in Figure 3 | | |
|---|---|---|---|---|
| | | Vis./210 | Init. Color | Aged Color |
| 1 | 38 | | 1 | 1. |
| 2 | 67.8 | | 1¼ | 1¾. |
| 3 | 222 | | 1¾ | 4½. |
| 4 | 2,521 | 85 | 3¼ | 5¾. |
| 5 | 5,499 | 149.2 | 4¾ | Too dark. |
| 6 | | 156 | 6½ | Do. |

The following table shows corresponding data for the seven cuts obtained from the oil which was treated according to the present invention. The viscosities of the various cuts do not correspond closely to the viscosities for the cuts in the preceding table; the discrepancy is probably attributable to different degrees of removal of naphtha from the respective materials prior to the distillation in the presence of caustic.

| Cut No. | Oil Treated with C₃H₇OH and NaOH—Product C in Figure 3 | | | |
|---|---|---|---|---|
| | Vis./100 | Vis./210 | Init. Color | Aged Color |
| 1 | 41.4 | | 1 | 1. |
| 2 | 64.6 | | 1¼ | 1½. |
| 3 | 191.2 | | 2 | 3½. |
| 4 | 1,462 | 69.8 | 3 | 4½. |
| 5 | | 128.5 | 4¾ | 5½. |
| 6 | | 170.8 | 6½ | Too dark. |
| 7 | | 215 | 7½ | Do. |

Another portion of the naphtha-oil layer was washed four times with 40% aqueous isopropanol in the absence of added caustic soda, the total amount of aqueous isopropanol employed being about 160 volume precent based on solvent-free oil, and each wash employing about the same amount of aqueous isopropanol. The treated oil was stripped of naphtha and distilled in the presence of 1½ volume percent of 50° Bé. caustic soda to obtain six 10% cuts. The following table shows the data for these cuts:

| Cut No. | Oil Treated with C₃H₇OH—Product B in Figure 3 | | | |
|---|---|---|---|---|
| | Vis./100 | Vis./210 | Init. Color | Aged Color |
| 1 | 37.6 | | 1– | 1–. |
| 2 | 65.3 | | 1¼ | 1¼. |
| 3 | 193 | | 2 | 3½. |
| 4 | | 73.8 | 3½ | 4¾. |
| 5 | | 141 | 4½ | Too dark. |
| 6 | | 177 | 6¾ | Do. |

The aged colors from the three tables above are plotted against viscosity in Figure 3 of the drawings, those samples which were too dark to measure being plotted at 8 NPA for convenience. Plot A represents the oil which was not alcohol-treated after removal of naphthenates; Plot B, the oil which was alcohol-treated in the absence of added alkali; and Plot C, the oil which was alcohol-treated in the presence of added alkali according to the process of the invention.

Figure 3 shows, by comparison of Plots A and C, that the color stabilities of heavier fractions of the oil treated according to the invention are substantially superior to those of fractions of the untreated oil having corresponding viscosity; and shows, by comparison of Plots B and C, that the presence of alkali in the second step according to the invention is essential to the obtaining of optimum results.

Referring now to Figure 4, the shaded area ABCD represents the isopropanol-water-sodium hydroxide proportions by weight which are preferred for use according to the invention. The proportions should be to the right of the line AD in order to provide the alkalinity which is essential to the treating agent, but should be to the left of the line BC in order to avoid the obtaining of a two-phase solution, which has been found to give unsatisfactory results. The proportions should be below the line CD in order to provide sufficient isopropanol concentration for satisfactory efficiency, but should be above the line AB in order to provide sufficient miscibility of isopropanol with sodium hydroxide so that a single-phase treating agent is obtained, and in order to avoid excessive miscibility of the treating agent with the oil phase. The line E represents in an approximate fashion the dividing line between the single-phase and multiple-phase regions of the diagram, as determined at 115–130° F.

The invention claimed is:

1. Process for refining petroleum which comprises: contacting in liquid phase a petroleum material containing constituents selected from the group consisting of naphthenic acids and soaps thereof with a treating agent comprising an aqueous solution of a lower alkanol; separating liquid petroleum material from liquid treating agent containing soaps of said naphthenic acids; subsequently contacting in liquid phase the petroleum fraction from which the naphthenic acid derivatives have been removed with a second treating agent comprising an aqueous solution of a lower alkanol of greater concentration than the first-named solution, thereby to remove impurities from the petroleum fraction, the latter contacting being performed in the presence of an inorganic base; and separating liquid petroleum from the second treating agent in liquid phase.

2. Process according to claim 1 wherein said petroleum fraction was previously obtained by contacting petroleum lubricating oil vapors in a treating zone with a liquid alkaline material containing a major proportion of oil, thereby to form alkali metal naphthenates in said material, the resulting material constituting said fraction, and wherein oil obtained from the second contacting with a lower alkanol is re-introduced into said treating zone to maintain a high concentration of oil in the liquid alkaline material.

3. Process according to claim 1 wherein said second treating agent comprises at least 30 weight percent of a lower alkanol, and 0.1 to 5 weight percent of an inorganic base, the amount of alkanol and base being such as to provide a single phase treating agent.

4. Process according to claim 3 wherein said alkanol is isopropanol, said base is sodium hydroxide, and the treating agent composition is within the area ABCD of Figure 4.

References Cited in the file of this patent

UNITED STATES PATENTS

| 2,068,126 | FitzSimons et al. | Jan. 19, 1937 |
| 2,451,025 | Ellender | Oct. 12, 1948 |

FOREIGN PATENTS

| 34,067 | Norway | Feb. 6, 1922 |
| 122,510 | Austria | Apr. 25, 1931 |
| 372,278 | Germany | Mar. 23, 1923 |